(No Model.)

P. MAUSER.
SHELL EXTRACTOR FOR BOLT GUNS.

No. 431,670. Patented July 8, 1890.

WITNESSES.
C. K. Fraser.
Fred White

INVENTOR.
Paul Mauser,
By his Attorneys,
Arthur C. Fraser & Co.

UNITED STATES PATENT OFFICE.

PAUL MAUSER, OF OBERNDORF, WÜRTEMBERG, GERMANY, ASSIGNOR TO THE WAFFEN-FABRIK MAUSER, OF SAME PLACE.

SHELL-EXTRACTOR FOR BOLT-GUNS.

SPECIFICATION forming part of Letters Patent No. 431,670, dated July 8, 1890.

Application filed December 3, 1889. Serial No. 332,374. (No model.) Patented in Belgium May 25, 1889, No. 86,375; in England November 12, 1889, No. 18,014; in Italy December 31, 1889, No. 26,450/137, and in Spain February 1, 1890, No. 10,226.

*To all whom it may concern:*

Be it known that I, PAUL MAUSER, a subject of the Emperor of Germany, residing in Oberndorf-on-the-Neckar, in the Kingdom of Würtemberg, Germany, have invented certain new and useful Improvements in Cartridge-Shell Extractors for Breech-Loading Bolt-Guns, of which the following is a specification.

This invention is the subject-matter of Letters Patent in Belgium, No. 86,375, dated May 25, 1889; in England, No. 18,014, dated November 12, 1889; in Italy, No. 26,450/137, dated December 31, 1889; in Spain, No. 10,226, dated February 1, 1890.

My invention provides a new cartridge-shell extractor designed to be used in those bolt-guns wherein the bolt is not provided with a separate bolt-head.

In the accompanying drawings the front portion of such a bolt is represented, the bolt here shown having the recoil or locking projections at its front end; but the invention is equally applicable to a bolt having these projections at any other part or being locked in any other way.

Figure 1:
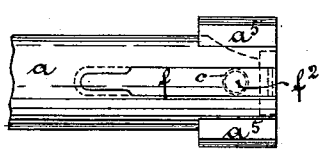
Figure 2:
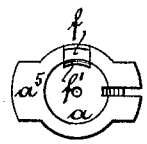
Figure 3:
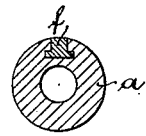
Figure 4:
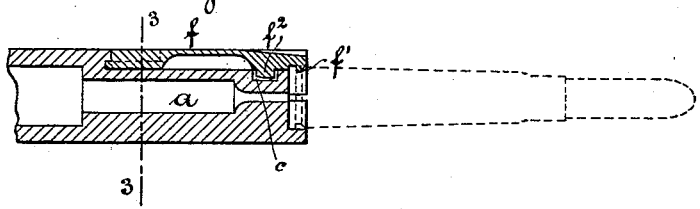

Figure 1 is a plan view of the front portion of the bolt, to which my new extractor is applied. Fig. 2 is a front end view thereof. Fig. 3 is a cross-section on the line 3 3 in Fig. 4. Fig. 4 is an axial vertical section.

There is considerable difficulty in fastening an effective shell-extractor in a simple and firm manner to a bolt which has no separate bolt-head. As screws, pins, and similar devices have not given sufficient solidity, I have invented the device which is the subject of this patent.

On the upper side of the bolt $a$, and between the two locking projections $a^5$, (if the bolt be formed with such projections,) a groove is milled into the bolt extending longitudinally thereof from its front end backwardly for a suitable distance. The front portion of the groove is wider than the rear portion, and the bottom of the rear or narrower portion is undercut to make it as wide as the front portion. Near the front end of the groove a shallow hole or socket $c$ is drilled into its bottom, being preferably formed somewhat obliquely.

The shell-extractor $f$ is formed with a steel plate, the middle portion of which is reduced in thickness and tempered to constitute it a spring, while its front end is formed with the well-known claw $f'$. The rear portion of the plate is made narrower on top and with side ribs at its bottom, so as to fit exactly in the rear portion of the groove in the bolt. The front portion of the extractor is formed on its under side with a round lug $f^2$ corresponding in position and shape to the hole $c$, drilled into the bottom of the groove. If the extractor $f$ is pushed back into the groove, this lug $f^2$ is lifted in passing the front portion of the groove, which the flexibility of the spring portion of the plate permits until when the extractor is fully home the lug $f^2$ will snap into the drilled hole $c$. The lug thus prevents the extractor being drawn out of its groove in longitudinal forward direction, while the ribs of the rear portion of the extractor prevent its displacement in radial direction. By the combination of these means the extractor is firmly secured in position without the use of any separate parts.

Obviously the socket $c$ and tooth $f^2$ might be otherwise shaped or formed, it being only essential that they shall present mutually abutting shoulders arranged to resist movement of the extractor in longitudinally forward direction, this being the direction in which the resistance of the shell when wedged in the barrel tends to displace the extractor as the bolt is started back.

I claim as my invention the following defined novel features or improvements, substantially as hereinbefore specified, namely—

1. The combination, with a bolt having a longitudinal groove extending back from its front end and the rear portion of which is laterally undercut, of an extractor consisting of a plate formed thick at its rear portion, with side ribs to fit the undercut portion of the groove, having a claw at its front end made thin and elastic at its middle portion to form a spring for the claw and formed at its front portion with a shoulder abutting against a shoulder on the bolt for preventing displacement of the extractor in forward direction, whereby the extractor is applied by sliding it longitudinally backward into said groove until its shoulder springs into engagement with that on the bolt, and when applied the extractor lies within the groove.

2. The combination, with a bolt having a longitudinal groove milled into it extending back from its front end and the rear portion of which is undercut, and with a socket at the bottom of the groove, of an extractor consisting of a plate having a claw at its front end, formed thick at its rear portion, with side ribs fitting the undercut portion of the groove, whereby its radial displacement is prevented, made thin and elastic in its middle portion to form a spring for the claw, and having a lug on its inner side entering said socket in the bolt, whereby its longitudinal displacement in forward direction is prevented.

This specification signed by me this 2d day of September, 1889.

PAUL MAUSER.

Witnesses:
EDMUND BRONCKI,
THEODORE ABENHEIM.